United States Patent
Barkan et al.

(10) Patent No.: US 7,494,065 B2
(45) Date of Patent: Feb. 24, 2009

(54) OPTICAL CODE READER SYSTEM AND METHOD FOR CONTROL OF ILLUMINATION FOR AIMING AND EXPOSURE

(75) Inventors: Edward O. Barkan, Miller Place, NY (US); David Tsi Shi, Stony Brook, NY (US); Mehul Patel, Fort Salonga, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 469 days.

(21) Appl. No.: 11/202,118

(22) Filed: Aug. 11, 2005

(65) Prior Publication Data
US 2007/0034696 A1   Feb. 15, 2007

(51) Int. Cl.
*G06K 7/10* (2006.01)

(52) U.S. Cl. .............. 235/472.01; 235/462.01; 235/462.2; 235/462.21; 235/462.22; 235/462.06; 235/462.45; 235/462.25; 235/454

(58) Field of Classification Search ............ 235/472.01, 235/454, 462.01–462.45, 462.48
See application file for complete search history.

(56) References Cited

U.S. PATENT DOCUMENTS

| 4,965,749 | A | * | 10/1990 | Straayer | 358/1.5 |
| 5,117,098 | A | | 5/1992 | Swartz | |
| 5,250,791 | A | * | 10/1993 | Heiman et al. | 235/462.21 |
| 5,598,121 | A | * | 1/1997 | Nam | 327/392 |
| 6,398,112 | B1 | | 6/2002 | Li et al. | |
| 2004/0069855 | A1 | * | 4/2004 | Patel et al. | 235/472.01 |
| 2004/0252201 | A1 | * | 12/2004 | Meitav et al. | 348/211.3 |

* cited by examiner

*Primary Examiner*—Le Thien Minh
*Assistant Examiner*—Tuyen K Vo
(74) *Attorney, Agent, or Firm*—Carter, DeLuca, Farrell & Schmidt, LLP (57) ABSTRACT

A system and method for reading an optical code is provided. The optical code reader system includes a dual aim/illumination assembly including a single light source generating: a) light having a first intensity for providing an aim pattern visible to a user for aiming the aim pattern at a target during an aim period of a scan cycle having at least an aim period and an exposure period; and b) light having a second intensity greater than the first intensity for providing illumination during the exposure period of the scan cycle. An imager module having an array of photo sensors senses incident light and generating image signals corresponding to the sensing during the exposure period.

12 Claims, 3 Drawing Sheets

OPTICAL CODE READER SYSTEM AND METHOD FOR CONTROL OF ILLUMINATION FOR AIMING AND EXPOSURE

BACKGROUND

1. Field of the Disclosure

This disclosure relates to an optical code reader system. In particular, this disclosure relates to an optical code reader system and method for control of illumination for aiming and exposure.

2. Description of the Related Art

Optical codes are patterns made up of image areas having different light reflective or light emissive properties, which are typically assembled in accordance with a priori rules. The term "barcode" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type.

Optical code readers are used in either fixed or portable installations in many diverse environments such as in stores for check-out services, in manufacturing locations for work flow and inventory control and in transport vehicles for tracking package handling. The optical code can be used as a rapid, generalized means of data entry, for example, for reading of a target barcode from a printed listing of many barcodes. In some uses, the optical code reader is connected to a portable data processing device or a data collection and transmission device. Frequently, the optical code reader includes a hand-held sensor which is manually directed at a target code.

An example of a conventional optical code is a one-dimensional barcode symbol. The barcode is a pattern of variable-width rectangular bars separated by fixed or variable width spaces. The bars and spaces have different light reflecting characteristics. One example of a one dimensional barcode is the UPC/EAN code used to identify, for example, product inventory. An example of a two-dimensional or stacked barcode is the PDF417 barcode. A description of PDF417 barcode and techniques for decoding it are disclosed in U.S. Pat. No. 5,635,697 to Shellhammer et al., and assigned to Symbol Technologies, Inc., which is incorporated herein by reference in its entirety. Another conventional optical code is known as "MaxiCode". It consists of a central finder pattern or bull's eye center and a grid of hexagons surrounding the central finder. It should be noted that the aspects of the disclosure are applicable to optical code readers in general, without regard to the particular type of optical codes which they are adapted to read. The disclosure described may also be applicable to some associated image recognition or analysis.

Optical code readers may be laser-based or imager-based. In a conventional imager-based optical code reader an imaging engine is provided having an image sensor having a two-dimensional array of cells or photo sensors, such as an area charge coupled device (CCD), which correspond to image elements or pixels in a field of view of the engine. The imaging engine further includes a lens assembly for focusing light incident on the image sensor and associated circuitry coupled to the image sensor outputting an array of electronic signals corresponding to a two-dimensional array of pixel information for the field of view. The electrical signals are digitized and provided as image data to a processor for processing thereof, including processing the image data for decoding the optical code.

An imager-based optical code reader typically further includes an aim assembly and/or an illumination assembly. Depending on the design of the optical code reader, upon a trigger pull a scan cycle is initiated, beginning with an aim period, during which the operator has an opportunity to aim the optical code reader at the target. During the aim period the aim assembly produces a visible aim pattern, such as a cross-hair or marker indicating the borders of the field-of-view, which is projected from the optical code reader as the reader is aimed at a target to assist the operator in aiming at the desired target. At the end of the aim period an exposure period is provided during which internal illumination is provided by the illumination assembly, and the array of photo sensors sense incident light. Depending on the design, projection of the aim pattern may be disabled during the exposure period, particularly when the aim pattern interferes during exposure.

The exposure period is followed by a decode period is provided, during which the sensing signals corresponding to the sensing during the exposure period are processed by at least one processing device, including for attempting to perform a decode operation. The decode period may be followed by another at least one period, such as a data transmission/ period, during which decoded data is transmitted to a another processing device, e.g., a host processor; and/or a status indicator period, during which an audio or visual indication is provided to the user indicating that a decode has occurred. In accordance with the design for some optical code readers, several scan cycles are repeated until the occurrence of an event, such as a successful decode operation is performed, a time out condition occurs or the trigger is released.

Prior art linear imager-based optical code readers may include a dual aim/illumination assembly having a light source which generates a light that is focused into a relatively narrow line. The narrow line of illumination provides two functions, where the first function includes providing a visible light pattern that the user can see and use for aiming the reader by placing the visible narrow line of illumination on the target optical code, and illuminating the linear field of view of the reader, so that when the reader is properly aimed, the target optical code is illuminated by the narrow line and the reader can decode the target optical code.

A read operation may include a series of exposure periods. During an exposure period an image of the target optical code is acquired. Motion of the reader or the target optical code during image acquisition can cause the image to be smeared and render it undecodeable. Accordingly, the exposure period is minimized for decreasing sensitivity to motion. Sufficient illumination is required for image acquisition. However, the shorter the short exposure period, the brighter the illumination for acquiring the image must be. In between exposure periods an image is not acquired, and the target optical code does not need to be illuminated for the purpose of acquiring an image. However, the aiming pattern is typically provided by the illumination system in between the exposure periods for easing aiming of the reader.

When the illumination intensity is increased for the purpose of minimizing sensitivity to motion, the reader requires an increased amount of current to the light source. When the current provided to the illumination system is increased for reducing motion sensitivity during the exposure periods, the same increased current is provided in between the exposure periods for generation of the aiming pattern, although there is not a need for increasing the intensity of the aiming pattern. The current requirements may exceed the output of an available power supply or consume a battery power supply exceedingly fast.

Accordingly, it is an aspect of the present disclosure to provide a system and method which decreases power consumption by a dual aim/illumination assembly of an optical code reader, while minimizing the exposure period for decreasing sensitivity to motion.

SUMMARY

In an embodiment of a system, in accordance with the present disclosure, an optical code reader system is provided having a dual aim/illumination assembly comprising a single light source generating: a) light having a first intensity for providing an aim pattern visible to a user for aiming the aim pattern at a target during an aim period of a scan cycle having at least an aim period and an exposure period; and b) light having a second intensity greater than the first intensity for providing illumination during the exposure period of the scan cycle. The system further includes an imager module having an array of photo sensors for sensing incident light and generating image signals corresponding to the sensing during the exposure period.

In another embodiment of the disclosure a dual aim/illumination assembly of an optical code reader system is provided. The dual aim/illumination assembly includes a single light source generating: a) light having a first intensity for providing an aim pattern visible to a user for aiming the aim pattern at a target during an aim period of a scan cycle having at least an aim period and an exposure period; and b) light having a second intensity greater than the first intensity for providing illumination during the exposure period of the scan cycle. During the exposure period an array of photo sensors of the optical code reader system senses incident light, and generates image signals which correspond to the sensing during the exposure period.

In another embodiment of the disclosure a method is provided for reading an optical code. The method includes the steps of generating light from a single light source having a first intensity for providing an aim pattern visible to a user for aiming the aim pattern at a target during an aim period of a scan cycle having at least an aim period and an exposure period, and generating light from the light source having a second intensity greater than the first intensity for providing illumination during the exposure period. The method further includes the steps of sensing incident light during the exposure period; generating image signals corresponding to the sensing; and decoding the image signals corresponding to the sensing.

BRIEF DESCRIPTION OF THE DRAWINGS

Various embodiments of the disclosure will be described herein below with reference to he figures wherein.

DETAILED DESCRIPTION OF THE PREFERRED EMBODIMENTS

An imager-based optical code reader system is provided having a dual aim/illumination assembly which includes one light source for providing exposure illumination during exposure periods in which respective images are acquired, and an aim pattern during periods in between exposure periods for assisting a user of the reader in aiming the reader. Intensity of the exposure illumination is intensified relative to the intensity of the aim pattern by increasing current flow to the light source during the exposure periods relative to the current flow during the periods in between the exposure periods. Overall power consumption is minimized since the exposure period during which current flow to the light source is high is short in comparison to the length of the periods in between the exposure periods during which the current flow to the light source is relatively low.

Figure 1:
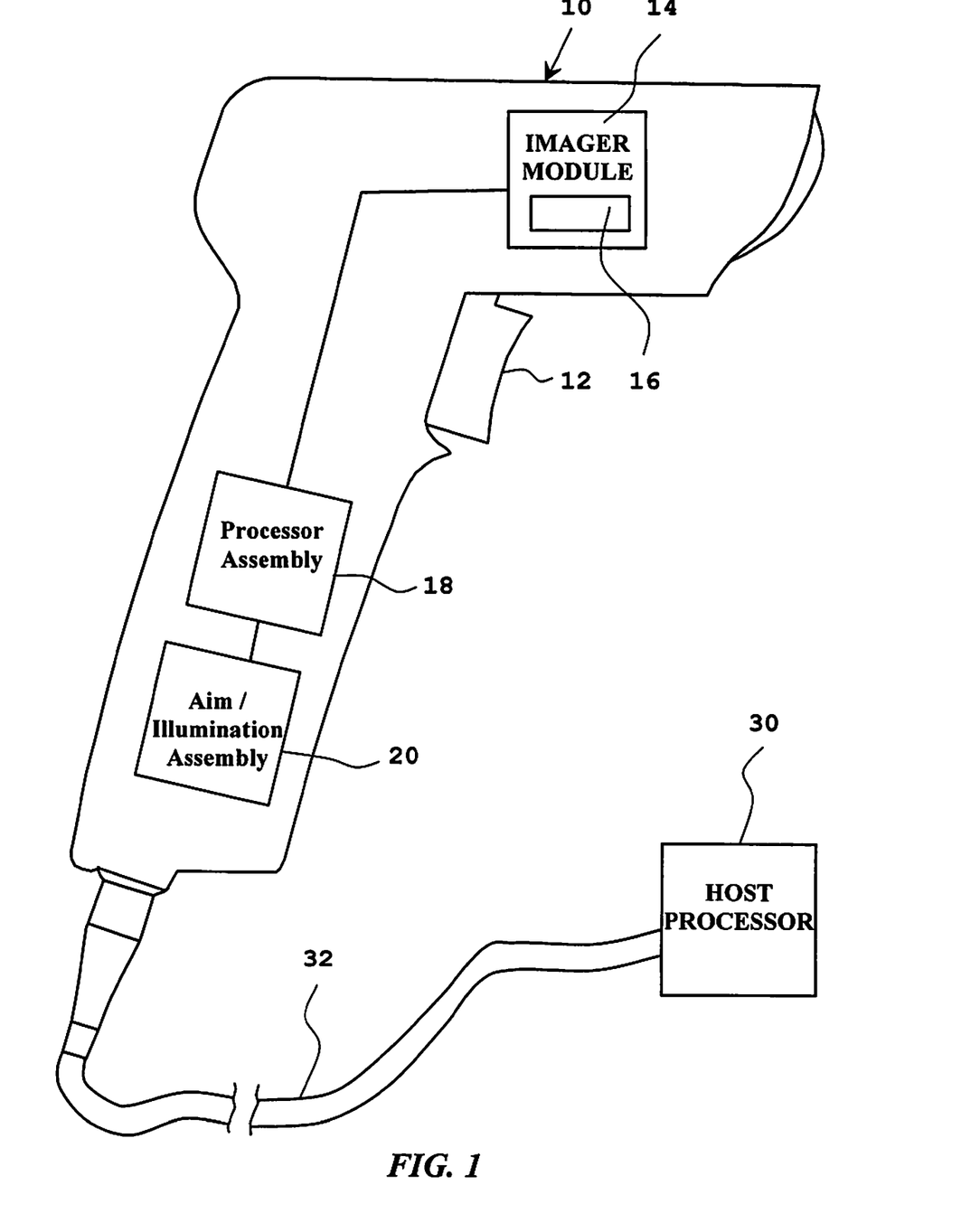
FIG. 1 is a schematic diagram of an optical code reader system in accordance with the resent disclosure.

Reference should be made to the drawings where like reference numerals refer to similar elements throughout the various figures. The present disclosure provides an optical code reader system 2 having an imager-based optical code reader 10 which may be data communication with at least one other device, such as a host terminal 30. The optical code reader 10 includes an actuator 12, an imager module 14 having a photo sensor array for acquiring images, a window 16 and a processor assembly 18 having control and logic circuitry which includes at least one processor, logic device and/or analog device and a dual aim/illumination assembly 20 having a single light source.

The optical code reader 10 may be configured as a handheld, portable and/or stationary device. The optical code reader 10 may further be configured to be incorporated into another device, such as a PDA or cellular phone. The optical code reader may be in wired or wireless communication with the at least one other device, such as the host processor 30 or a network via communication interface 32. The system may further include one or more components or modules, such as a keyboard, display, printer, data storage, application software, and/or a database. The system 2 may further be in communication with another system or network. Communication interface 32 may be wired or wireless and include, for example, a cable, telephone exchange network, either through a modem or an ISDN interface, an infrared data interface (IRDA) and/or a multi-contact shoe. Data transmitted by the communication interface 32 may include compressed data.

The actuator 12 may be a trigger or a switch (hardware or software), which may be activated by a user, a sensor, a processor, a host terminal, etc., for generating an actuation signal upon activation of the actuator 12 for initiating a read operation. The actuation signal may be generated by the host terminal and received by the optical code reader 10, such as in the form of a command. Upon generation of the actuation signal the reader 10 prepares to perform the read operation, which may include powering up, enabling and/or initializing the reader 10 and the appropriate communication paths so that the necessary sensing, processing and transmissions will take place for attempting the read operation and outputting any results.

Figure 2:
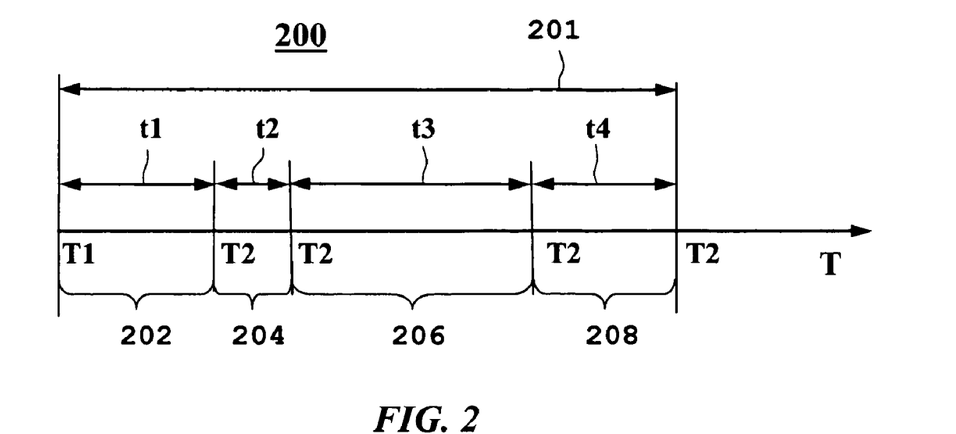
FIG. 2 is a timing diagram of a scan cycle of a read operation performed with an optical code reader in accordance with the present disclosure.

FIG. 2 shows a timeline 200 for a scan cycle 201 of an exemplary read operation. Exemplary scan cycle 201 includes periods 202, 204, 206 and 208. Period 202 begins at time T1 upon actuation of the actuator 12. Period 202 is an aim period during which illumination is provided at a first level by the single light source of the dual aim/illumination assembly 20. During the aim period an image is not acquired since the photo sensor array does not perform an exposure sequence during the aim period. While the first level of illumination may be sufficient for acquisition of an image, the image quality is relatively poor, where the poor quality may interfere with decodability of the image.

Period 204 begins at time T2 after lapse of a time interval t1 following T1. Period 204 is an exposure period during which exposure illumination is provided at a second level which is more intense than the first level by the single light source of the dual aim/illumination assembly 20. During the exposure period an image is acquired as the photo sensor array performs an exposure sequence. The second level of illumination is sufficient for acquiring an image of good decodable quality.

Period 206 begins at time T3 after lapse of a time interval t2 following T2, which is the duration of the exposure period. Preferably, duration of time interval t2 is selectable in accordance with signal levels of the image acquired during the previous exposure period. For example, if the signal levels indicate that a previously acquired image was underexposed, the duration of time interval t2 of a subsequent (e.g., next) exposure period is increased, and vice versa. Period 206 is a decode period during which a decode operation is performed by the processor assembly 18 on an image signal output by the imager module 14, and if successful the decoded code is output, such as to the host processor 30. Illumination may be provided at the first level during decode period 206, or alternatively, no illumination may be provided during decode period 206, in accordance with design choice.

Period 208 begins at time T4 after lapse of a time interval t3 following T3. Period 208 may be, for example, a data transmission/ period, during which decoded data is transmitted to an another processing device, e.g., a host processor; and/or a status indicator period, during which an audio or visual indication is provided to the user indicating that a decode has occurred. Illumination may be provided at the first level during period 208, or alternatively, no illumination may be provided during period 208, in accordance with design choice.

The scan cycle 201 is completed at the end of period 208 after lapse of a time interval t4 at time T5. In accordance with design choice, the read operation may include repetition of scan cycle 201 until the occurrence of an event, such as a successful decode operation, a time out condition occurs or the actuator 12 is released. The timeout condition may occur, for example, when the amount of time passed since the actuator was activated exceeds a threshold value without performance of a successful decode operation. The threshold value may be predetermined, or may be selectable, such as in accordance with user choice, operating conditions or previous performance.

With continued reference to FIG. 1, the imager module 14 includes an array of photo sensors for sensing light reflected from objects lying within the field of view (FOV) of the optical code reader 10 and transmitted through window 16. The array of photo sensors may include one or two rows of photo sensors for imaging a linear portion of a target being imaged, such as when the reader 10 is a linear imager reader. Alternatively, the array of photo sensors may be a two-dimensional array of photo sensors for imaging a two-dimensional area of a target being imaged, such as in an area imager reader. The imager module 14 may include a charge coupled device (CCD). However, it is to be understood that other area or linear image sensors may be used for the intended purpose, such as CMOS, charge modulated device (CMD) or charge injection device (CID) sensors. Image acquisition is performed by the imager module 14 in which the photo sensor array senses incident light, and generates corresponding electrical image signals that represent an image corresponding to the sensing. The image signals are transmitted for further processing thereof.

The imager module 14 further includes circuitry for converting from analog to digital, amplifying, filtering buffering and/or processing the image signals, for preparing the image signals to be in a condition and format suitable for processing by the processor assembly 18. The imager module 14 further includes an objective lens assembly (not shown) which includes at least one lens for focusing light incident on the array of photo sensors, and may further include a lens guidance assembly for supporting the at least one lens, and a lens adjustment mechanism for moving the at least one lens along the lens guidance assembly for changing the focus of the lens assembly, and thus the focal length of the optical code reader 10.

Furthermore, the imager module 14 includes a shutter module 40 which includes a shutter, which may be an electrical shutter or a mechanical shutter. The exposure period of a scan cycle occurs when the shutter module 40 is operated to enable the photo sensors of the imager module 14 to generate image signals responsive to sensing of incident light reflected from a target, where the reflected light is a combination of ambient light and light provided by the dual aim/illumination assembly 20. Image signals generated during the exposure period are provided to the processor assembly 18 for decoding thereof. The shutter module 40 receives an exposure control signal from the processor assembly 18 which controls operation of the shutter module 40. In the case of an electric shutter, the exposure is enabled by electrical devices (not shown) within the imager module 14 which are controlled by the exposure control signal. The shutter module 40 may be incorporated into the imager module 14 or may be external to the imager module 14.

For a mechanical shutter, the exposure control signal may be converted into an analog signal having a characteristic (such as voltage) that corresponds to the value of the corresponding exposure control signal. For example, the mechanical shutter may be controlled for opening the shutter an amount of time that corresponds to a magnitude of the characteristic of the analog control signal for allowing light reflected from a target to be incident on the photo sensor array of the imager module 14 for sensing thereof.

Figure 3:
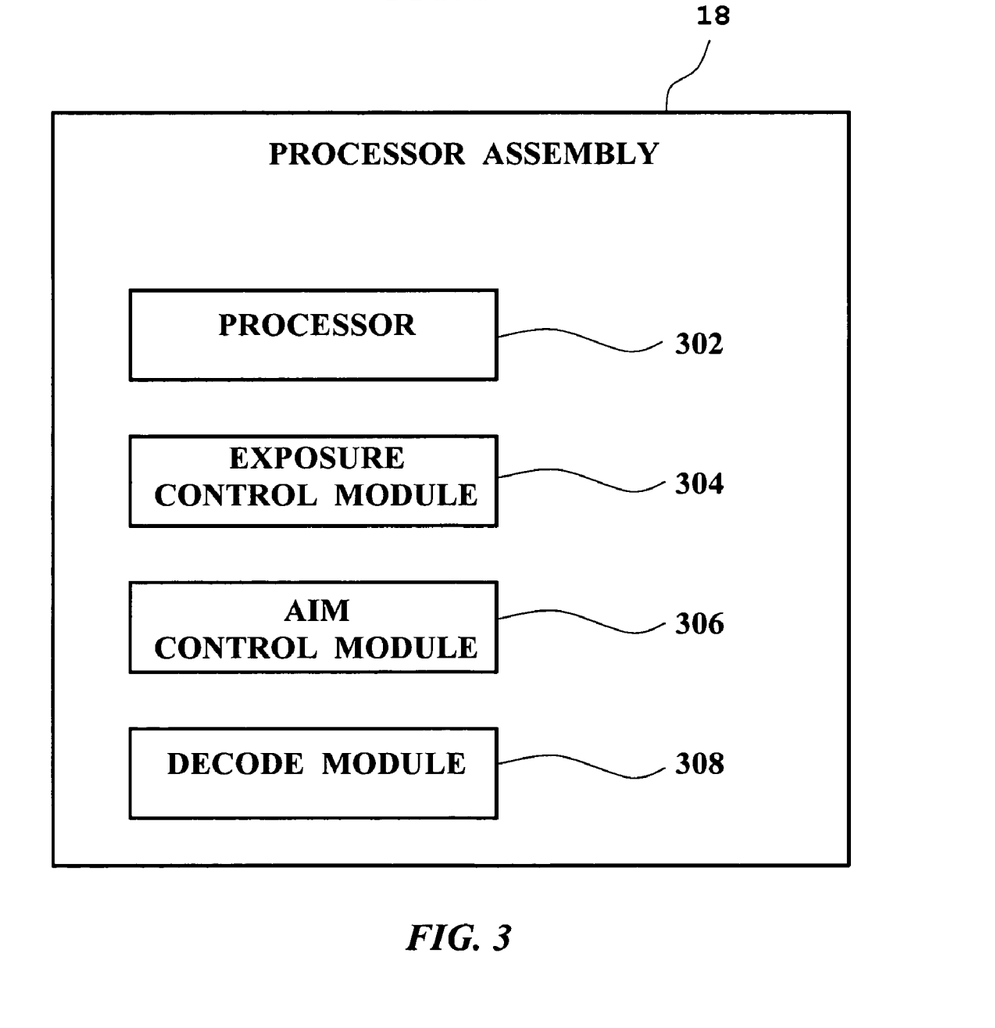
FIG. 3 is a block diagram of a processor assembly of the optical code reader system shown in FIG. 1.

With respect to FIG. 3, the processor assembly 18 includes at least one processor 302, which may include a microprocessor(s), a field programmable gate array (FPGA) and/or other processing device(s), and may further include at least one storage component, such as a flash memory device and/or a static RAM memory device. Further, the processor assembly 18 may communicate with the host processor 30. The processor assembly 18, or portions thereof, may be incorporated into the reader 10 or externally there to, such as in the host processor 18. Components of the reader 10, such as an A/D converter, may be incorporated into the processor assembly 18, e.g., be provided on the same chip, or share devices with the processor assembly 18.

The processor assembly 18 further includes software modules including exposure control module 204, aim control module 306 and decode module 308, which include, respectively, a series of programmable instructions executable on the at least one processor 302. The series of programmable instructions can be stored on a computer-readable medium, such as ROM, flash memory, RAM, a hard drive, CD-ROM, smart card, 3.5" diskette, etc., or transmitted via propagated signals for being executed by the processor assembly 18 for performing the functions disclosed herein and to achieve a technical effect in accordance with the disclosure. The processor assembly 18 is not limited to the software modules described. The functions of the respective software modules may be combined into one module or distributed among a different combination of modules.

The processor assembly 28 may further include additional software modules executable on the at least one processor 302 for providing control to components of the reader 10 and/or processing the image signals in addition to decoding thereof. For example, the processor assembly 18 may include a module for generating lens adjustment control signals for controlling the lens adjustment mechanism.

The exposure control module 304 generates the exposure control signal which is provided to the shutter module 40 for controlling the shutter module 40 in order that the photo sensors of the imager module 14 are exposed and generate image signals which will be processed by the decode module 308. As described further below, the exposure control signal is also provided to the dual aim/illumination assembly 20 for controlling the dual aim/illumination assembly 20 for enabling an increased flow of current to the at light source of the aim/illumination assembly 20 during the exposure period 204 only, wherein the flow of current to the light source is decreased or disabled during other periods of the scan cycle. Thus the light intensity is increased for generating the more intense exposure light only during exposure, and conserving power during other periods of the scan cycle by not generating any light, or by generating the less intense aim pattern light.

The aim control module 306 generates an aim control signal which is provided to the aim/illumination assembly 20 for enabling a flow of current to the light source of the aim/illumination assembly 20 which is less than the flow of current enabled during the exposure period. The aim control module 306 may enable the decreased flow of current to the light source during the aim period only, or the aim period in addition to the exposure period (where the decreased flow of current is combined with a flow of current enabled by the exposure control signal for providing the increased flow of current) and/or other periods of the scan cycle, such as the decode cycle.

The aim control module 306 may respond to an actuation signal generated upon activation of the actuator 12 so that the aim pattern is generated immediately upon activation of the actuator 12 by the user. The aim pattern may be generated until the read operation is terminated, e.g., upon a successful decode operation or upon a time-out condition. Alternatively, the aim pattern may be generated only during the aim period, or during the aim period and at least one of the other periods of the scan cycles included in the read operation, e.g., the exposure period and./or the decode period.

The decode module 308 receives image signals generated by the imager module 14 which have been operated on by circuitry of the imager module 14 to be in proper condition for processing by the decode module 308. The decode module 308 performs a decode operation on the image signal and outputs a corresponding decoded code. It is contemplated that the image signal may be provided or retrieved by the decode module 308 in portions. For example, the decode module 308 may process image signals corresponding to a first portion of an optical code being scanned as a next portion of the optical code is being acquired. The decode operation may include decoding a barcode or other type of symbol, such as a text code including alphanumeric characters. The decoding process may include character recognition processing.

When the decode operation is successful the decode module 308 outputs a decoded code, such as to the host processor 30. If the decode operation is unsuccessful the decode module 308 waits for receipt of a next frame of an image signal for attempting a decode operation thereupon. A timeout condition may occur when the amount of time passed since the actuator was actuated exceeds a threshold value without performing a successful decode operation.

Figure 4A:
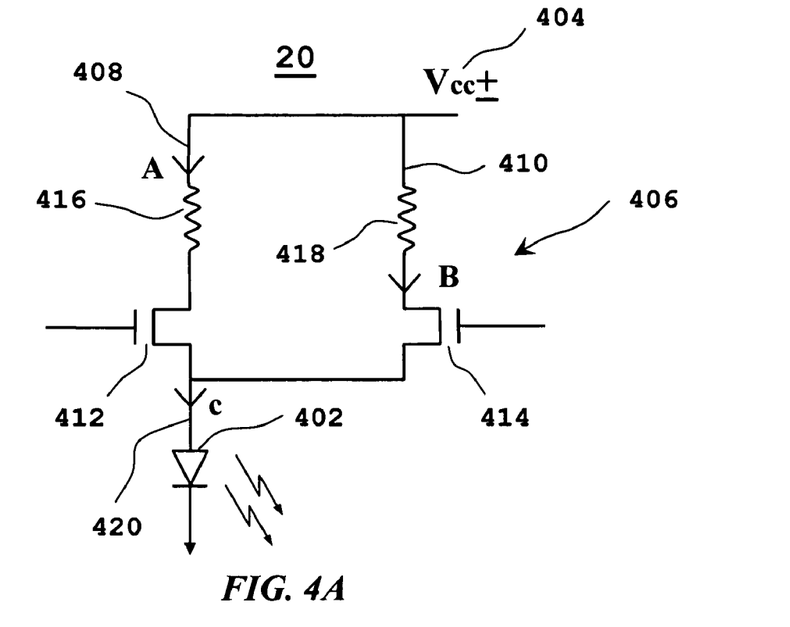
FIG. 4A is a schematic diagram of an embodiment of a dual aim/illumination assembly of the optical code reader system shown in FIG. 1.
Figure 4B:
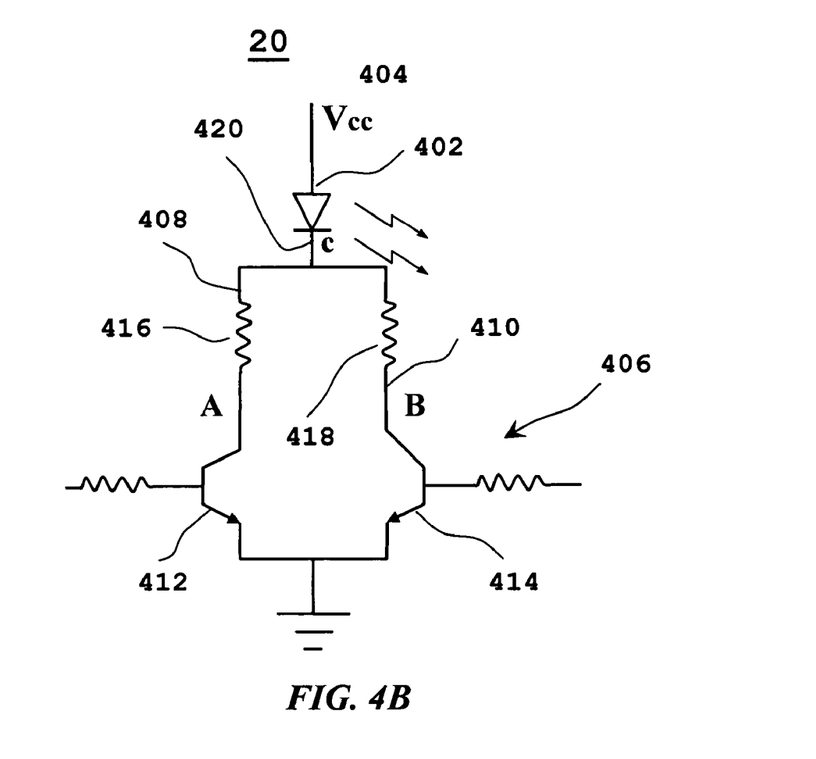
FIG. 4B is a schematic diagram of another embodiment of a dual aim/illumination assembly of the optical code reader system shown in FIG. 1.

With reference to FIGS. 4A and 4B, first and second exemplary embodiments of the aim/illumination assembly 20 are shown. It is envisioned that circuits other than the one shown may be used to provide a first current flow to the light source during the aim period, and a second current flow tot the light source 202 during the exposure period, where the second current flow is greater than the first current flow. The dual aim/illumination assembly 20 shown includes a light source 402, a power source 404, and circuitry 406, including first and second current paths 408 and 410, respectively, which are parallel to one another. In the example shown, the circuitry 406 further includes a first switching device 412 disposed along the first current path 408, and a second switching device 414 disposed along the second current path 410. The first current path 408 is provided with a first resistive device 416, and the second current path 410 us provided with a second resistive device 418. Current flowing along path 420 is provided to the light source 402, where the current flow along path 420 is proportional to the intensity of light generated by the light source 402.

Light source 402 includes at least one light generating device such as a light emitting diode (LED), quartz halogen bulb, laser diode or laser tube, where the light intensity varies proportionally (not necessarily in linear proportions) to the current provided to the light source 402. The power source 406 may be a power source providing power to other components of the reader 10, or may be dedicated to providing power to the light source 402. The power source 406 may be a DC source, such as a battery, or may be an AC source. The switching devices 412 and 414 may be devices such as transistors, field effect transistors (FETs), etc. Switching device 412 receives the aim control signal, wherein the aim control signal enables a flow of current A from the power source 406 to the light source 402 along the first current path 408. The switching device 414 receives the exposure control signal, wherein the exposure control signal enables a flow of current B from the power source 406 to the light source 402 along the second current path 410.

The flow of current C through path 420 is a sum of the flow of current through paths 410 and 408, which is A+B. Preferably, the aim control signal is HIGH during the aim period and the exposure period for enabling the flow of current A along the path 408 during at least the aim and exposure periods. The exposure control signal is HIGH only during the exposure period, enabling the flow of current B along the path 410 only during the exposure period. Accordingly, the flow of current C through path 420 during the aim period is equal to A, and the flow of current C through path 420 during the exposure period is equal to A+B. Accordingly, the current flow during the exposure period is greater than the current flow during the aim period. Depending on whether the aim pattern is enabled during the other periods of the scan cycle, e.g., the decode period, the flow of current C through path 420 during the other period of the scan cycle is A or none.

It is contemplated that the aim control signal may be LOW during the exposure period, yet the flow of current C through path 420 is higher during the exposure period than during the aim period or other periods of the scan cycle by providing the flow of current B to be greater than the flow of current A. Providing the flow of current B to exceed the flow of current B may be accomplished, for example, by providing resistive device 416 to be greater than resistive device 418, or by providing a first power source for supplying power to path 416, and a second power source for supplying power to path 418, where the second power supply supplies a greater power than the first power supply.

As described above, the light intensity emitted by the light source 202 is increased during the exposure period for generating the more intense exposure light only during exposure, while power is conserved during other periods of the scan cycle in between the exposure periods by not generating any light, or by generating the less intense aim pattern light. Power consumption is reduced since the exposure periods during which high current is provided are relatively short with reference to the periods in between the exposure periods during which a lower current is provided. While conserving power, advantages are achieved by providing the increased current to the light source during the exposure periods, including a) increasing the working range of the reader 10, and b) reducing the exposure time which minimizes sensitivity to motion, such as due to hand jitter of a hand aiming the reader 10 during a read operation.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

The invention claimed is:

1. An optical code reader system comprising:
    a dual aim/illumination assembly comprising a single light source generating: a) light having a first intensity for providing an aim pattern visible to a user for aiming the aim pattern at a target during an aim period of a scan cycle having at least an aim period and an exposure period: and b) light having a second intensity greater than the first intensity for providing illumination during the exposure period of the scan cycle, the exposure period begins at a time after lapse of a time interval associated with the aim period: and
    an imager module having an array of photo sensors for sensing incident light, and generating image signals corresponding to the sensing during the exposure period, wherein the dual aim/illumination assembly includes circuitry operating on a current provided to the light source, wherein the circuitry operates on the current for causing the current to flow at a first current flow during the aim period and at a second current flow greater than the first current flow during the exposure period, wherein the second current flow is greater than the first current flow, wherein the circuitry includes parallel first and second current paths, and the current provided to the light source is a sum of the current flowing through the first path and the current flowing through the second path.

2. The optical code reader system according to 1 further comprising at least one processor for controlling the circuitry.

3. The optical code reader system according to claim 2 wherein the processor further decodes the image signals.

4. The optical code reader system according to claim 3 wherein:
    the imager module further comprises a shutter which is enabled during the exposure period via an exposure control signal to allow the array of photo sensors to be exposed to incident light for sensing the incident light and providing the corresponding image signals to the at least one processor for decoding thereof;
    the exposure control signal is generated by the at least one processor; and
    the exposure control signal is provided to the circuitry for controlling the circuitry.

5. The optical code reader system according to claim 1 wherein when the current flows through the second path the current provided to the light source flows at the second current flow.

6. The optical code reader system according to claim 1 further comprising at least one processor; wherein:
    the circuitry includes first and second switching devices disposed along the first and second paths, respectively, for enabling flow of current along the first and second paths, respectively; and
    the at least one processor generates a first control signal for enabling the first switching device at least during the aim period and a second control signal for enabling the second switching device only during the exposure period.

7. A dual aim/illumination assembly of an optical code reader system comprising:
    a single light source generating: a) light having a first intensity for providing an aim pattern visible to a user for aiming the aim pattern at a target during an aim period of a scan cycle having at least an aim period and an exposure period: and b) light having a second intensity greater than the first intensity for providing illumination during the exposure period of the scan cycle, the exposure period begins at a time after lapse of a time interval associated with the aim period;
    wherein during the exposure period an array of photo sensors of the optical code reader system senses incident light, and generates image signals which correspond to the sensing during the exposure period, wherein the dual aim/illumination assembly includes circuitry operating on a current provided to the light source, wherein the circuitry operates on the current for causing the current to flow at a first current flow during the aim period and at a second current flow greater than the first current flow during the exposure period for causing the light intensity to be greater during the exposure period relative to the aim period, wherein the circuitry includes parallel first and second current paths, and the current provided to the light source is a sum of the current flowing through the first path and the current flowing through the second path.

8. The dual aim/illumination assembly according to claim 7 wherein when the current flows through the second path the current provided to the light source flows at the second current flow.

9. The dual aim/illumination assembly according to claim 7 further comprising at least one processor; wherein:
    the circuitry includes first and second switching devices disposed along the first and second paths, respectively, for enabling flow of current along the first and second paths, respectively; and
    the at least one processor generates a first control signal for enabling the first switching device at least during the aim period and a second control signal for enabling the second switching device only during the exposure period.

10. A method for reading an optical code comprising the steps of:
    generating light from a single light source having a first intensity for providing an aim pattern visible to a user for aiming the aim pattern at a target during an aim period of a scan cycle having at least an aim period and an exposure period;

generating light from the light source having a second intensity greater than the first intensity for providing illumination during the exposure period, the exposure period begins at a time after lapse of a time interval associated with the aim period;

sensing incident light during the exposure period; generating image signals corresponding to the sensing;

decoding the image signals corresponding to the sensing;

varying a current flow to the light source between a first current flow during the aim period and a second current flow greater than the first current flow during the exposure period;

enabling a first path for the current to flow along to the light source at least during the aim period; and enabling a second path for the current to flow along to the light source only during the exposure period, wherein when the current flows to the light source during the exposure period the current flow is a sum of the current flowing through the first path and the second path.

11. The method according to claim 10 wherein when the current flows along the second path the current flowing to the light source flows at the second current flow.

12. The method according to claim 10 further comprising the step of disabling at least one of the sensing, the generating image signals corresponding to the sensing and decoding image signals corresponding to the sensing;

wherein the second path is enabled when the sensing, generating image signals corresponding to the sensing and decoding the image signals corresponding to the sensing are enabled.

* * * * *

UNITED STATES PATENT AND TRADEMARK OFFICE
CERTIFICATE OF CORRECTION

PATENT NO. : 7,494,065 B2  Page 1 of 2
APPLICATION NO. : 11/202118
DATED : February 24, 2009
INVENTOR(S) : Barkan et al.

It is certified that error appears in the above-identified patent and that said Letters Patent is hereby corrected as shown below:

IN THE DRAWINGS

In Fig. 1, Sheet 1 of 3, delete "  " and insert --  --, therefor.

In Column 3, Line 53, delete "he" and insert -- the --, therefor.

In Column 3, Line 55, delete "resent" and insert -- present --, therefor.

In Column 9, Line 36, in Claim 1, delete "period:" and insert -- period; --, therefor.

In Column 9, Line 40, in Claim 1, delete "period:" and insert -- period; --, therefor.

In Column 9, Line 56, in Claim 2, after "according to" insert -- claim --.

In Column 9, Line 56, in Claim 2, delete "1" and insert -- 1, --, therefor.

In Column 9, Line 58, in Claim 3, delete "2" and insert -- 2, --, therefor.

In Column 9, Line 60, in Claim 4, delete "3" and insert -- 3, --, therefor.

In Column 10, Line 5, in Claim 5, delete "1" and insert -- 1, --, therefor.

In Column 10, Line 9, in Claim 6, delete "1" and insert -- 1, --, therefor.

UNITED STATES PATENT AND TRADEMARK OFFICE
CERTIFICATE OF CORRECTION

PATENT NO.       : 7,494,065 B2
APPLICATION NO.  : 11/202118
DATED            : February 24, 2009
INVENTOR(S)      : Barkan et al.

It is certified that error appears in the above-identified patent and that said Letters Patent is hereby corrected as shown below:

In Column 10, Line 25, in Claim 7, delete "period:" and insert -- period; --, therefor In Column 10, Line 48, in Claim 8, delete "7" and insert -- 7, --, therefor In Column 10, Line 52, in Claim 9, delete "7" and insert -- 7, --, therefor Signed and Sealed this Twenty-fourth Day of November, 2009

David J. Kappos
*Director of the United States Patent and Trademark Office*